March 4, 1969   S. GUARNASCHELLI   3,430,662
FLEXIBLE SEGMENTED TUBE
Filed Sept. 21, 1964
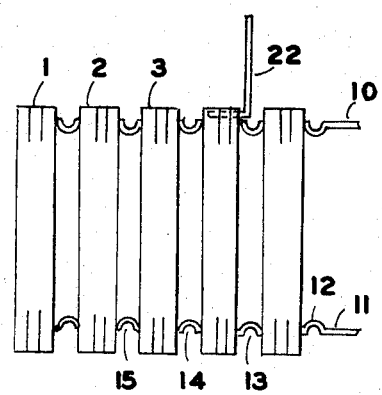
FIG 1
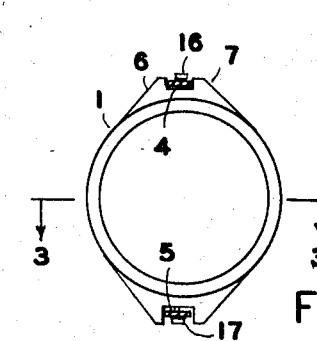
FIG 2
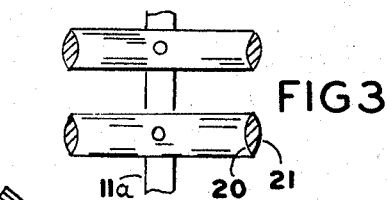
FIG 3
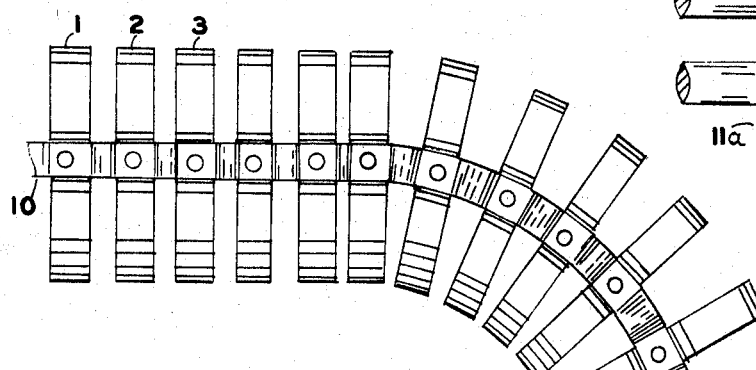
FIG 4
FIG 5
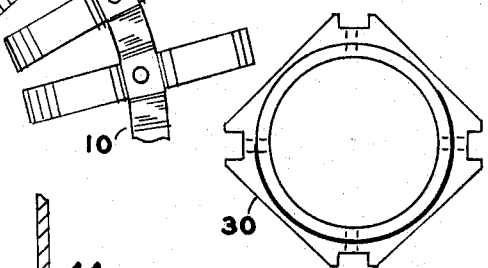
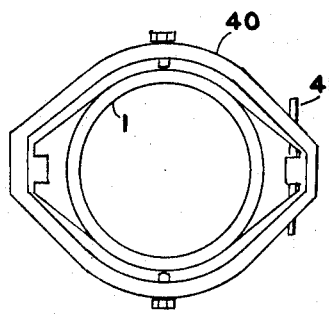
FIG 6
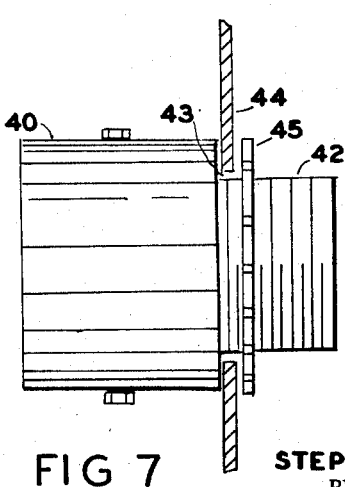
FIG 7
INVENTOR.
STEPHEN GUARNASCHELLI
BY James P. Malone

# United States Patent Office 3,430,662
Patented Mar. 4, 1969

3,430,662
FLEXIBLE SEGMENTED TUBE
Stephen Guarnaschelli, Garden City, N.Y.
(4608 Wayfarer Place, Orlando, Fla. 32807)
Filed Sept. 21, 1964, Ser. No. 397,809
U.S. Cl. 138—120                    2 Claims
Int. Cl. F16l *3/02, 7/00;* H01b *7/18*

This invention relates to electrical distribution system means and more particularly to conduit for supporting electrical cables, and the like.

This application is an improvement of my prior Patent No. 3,098,115, of the same title, granted July 16, 1963.

The conduit in that application comprised a pair of slotted members, each having a hemispherical cross-section with extending lips and the lips being seam welded together to form a rounded enclosure. Each of the members were slotted in order to permit flexibility in one plane.

Other conventional electrical conduits generally comprise solid material pipe which are connected together like plumbing with threaded joints. The solid pipe systems are not flexible and must be cut and threaded and connected to right angle joints and so forth in order to go around various obstructions. My prior patent is an improvement over the solid pipe conduit in that it is flexible in one plane. However, it requires continuous seam welding along the two lips. This welding operation is difficult to perform on light weight material such as aluminum and cannot be performed at all in the field.

The present invention generally comprises a plurality of metal rings and means to connect the rings in spaced relation comprising a pair of metal strips, said strips having equally spaced transverse ripples therein, the rings being connected to the strips between the ripples and the strips being placed on the opposite side of the rings.

It has been found that this conduit is substantially rigid in the plane defined by the longitudinal axes of the strips but is flexible in the plane perpendicular to that plane.

This flexibility eliminates the necessity for connecting 90° fittings and so forth in order to guide the conduit around obstacles. Since the rings may be secured by the strips by machine screws, the conduit of the present invention may be easily shortened or lengthened on the job so that the detailed measurements are not necessary for prefabricating the desired lengths of conduit.

Adapter ring means are provided for connecting the conduit so that flexible joints may be obtained in vertical and horizontal planes.

Accordingly, a principal object of the invention is to provide new and improved conduit or support means.

Another object of the invention is to provide new and improved electrical cable support means which are flexible in one plane and substantially rigid in the perpendicular plane.

Another object of the invention is to provide new and improved electrical conduit means which are easy to install on the job with simple tools, and with a minimum of labor cost.

Another object of the invention is to provide new and improved electrical conduit means which is ventilated.

Another object of the invention is to provide new and improved electrical conduit means which is easy to splice.

Another object of the invention is to provide new and improved conduit protection means for electrical cables, hoses, pipes, or the like.

Another object of the invention is to provide new and improved support means for electrical cables, hoses, pipes or the like.

Another object of thet invention is to provide new and improved electrical conduit means which is light in weight.

Another object of the invention is to provide new and improved elongated structural means of predetermined flexibility or rigidity which may be easily shortened or lengthened as desired.

Another object of the invention is to provide new and improved conduit and support means for cables, hoses, pipes, or the like, comprising a plurality of metal rings, means to connect said metal rings in spaced relation comprising, a pair of metal strips, said strips having equally spaced transverse ripples therein, said rings being connected to said strips between said ripples, said strips being placed on opposite sides of said rings.

These and other objects of the invention will become apparent from the following specification and drawings of which:

FIGURE 1 is a side view of the embodiment of the invention.

FIGURE 2 is an end view of FIGURE 1.

FIGURE 3 is a cross-secitonal view of a ring member.

FIGURE 4 is a top view of FIGURE 1, illustrating flexibility in one plane.

FIGURE 5 is a front view of the adapter ring member for adapting two sections of conduit with 90° rotation to each other.

FIGURES 6 and 7 are front and side views of end connector means for connecting the conduit to electrical boxes or the like.

Referring to the figures, the invention generally comprises a plurality of rings 1, 2, 3, and so forth which may be molded or die-cast for instance, of aluminum as shown in FIGURE 2. The rings are generally rounded and have flat mounting portions 4 and 5 with tapped holes which are preferably bounded by the shoulders 6 and 7 and so forth. A pair of metal strips 10 and 11 are provided on opposite sides of the rings. The strips have equally spaced transverse ripples or indentations 12, 13, 14, and 15 and the strips are fastened to the rings by means of machine screws 16 and 17 and so forth or by other conventional means. The ripples or corrugations may extend to the inside, as shown, or to the outside.

FIGURE 3 shows a cross-sectional view of two of the rings taken along the lines 3—3 of FIGURE 2 illustrating the rounded inner surface 20, and the rounded outer surface 21. The purpose of the rounded inner surface is to minimize the force required to pull cables, pipes, or hoses through the conduit and to do so without cutting or scraping the cables, etc. If the rings were flat, the surface edges might damage the cables, etc. when they are being pulled through.

In this embodiment, the strips 11*a* are shown flat which provide a substantially rigid structure if the thickness of the strips is sufficient. Also more than two flat strips may be used for instance, with the rings shown in FIGURE 5, to provide a firm rigid structure. The rigidity is increased by increasing the thickness of the strips and decreased by decreasing the thickness of the strips.

The outer surface 21 is also rounded in order to facilitate dragging the conduit along the floor or walls prior to installation. The rounded outer surface prevents snagging the cable on obstacles as it is being slid along the floor or when it is being placed during installation.

FIGURE 4 illustrates how the conduit is flexible in the curved surface defined by the longitudinal axes of the strips 10 and 11. This flexibility is provided because of the transverse ripples in the strips. However, the conduit is substantially rigid in the plane perpendicular to the flexure plane of FIGURE 4. This operation is unobvious because the strips by themselves act in the reverse manner, namely they flex at 90° to the plane of flexure shown in FIGURE 4.

The strips 10 and 11 may be secured by other means other than machine screws, for instance by spot welding or by rivets. However, spot welding is difficult in the case of aluminum and cannot be readily done on the job. With the present arrangement, the conduit can be installed quite easily with very simple tools, and the conduit may be lengthened or shortened by adding or subtracting rings with a screwdriver and the strips may be easily cut with a sheet metal cutter or hack saw or the like. In operation the conduit may be supported from the ceiling by means of conventional straps such as strap 22 which may be fastened to the conduit by means of one machine screw, such as machine screw 16.

If the conduit is supported from the ceiling by the strap 22, then it is flexible in the horizontal plane. If it is desired to make a bend in a vertical plane, then it is necessary to rotate a section of the conduit 90°. In order to do this, we do not need special junction fittings but we do need several adapter rings such as the ring 30 shown in FIGURE 5. This ring is similar to the other rings except it has flat portions having a tapped hole spaced 90° instead of spaced 180° as in the other rings.

Therefore, by using one or more of the adapter rings, two sections of the conduit may be coupled together which are rotated 90° with respect to each other with the strips overlapping and with the strips of one section connected to the adapter rings 30 in one plane for instance a vertical plane and the strip of the other section being connected by the same rings 30 in the horizontal plane. A group of two or three adapter rings is sufficient for such a connection.

Therefore, by using the adapter rings, bends may be made in vertical or horizontal planes and these bends may be fabricated on the job as the occasion demands, without any shop work or prefabricating of the lengths of the conduit.

If desired, the adapter rings may have additional equally spaced mountings to permit rotations of smaller angular amounts.

FIGURES 6 and 7 show end coupling means for the conduit for instance, to connect into electrical connection boxes.

The end coupling, FIGURES 6 and 7, comprises a casting 40 which is adapted to be fitted over the conduit. The casting 40 has its interior surface shaped to accommodate the projections of the conduit caused by the raised shoulders of the rings and the strip members. The end casting 40 may be fastened to the conduit by passing a pin or bolt 41 through one of the ripples in the casting where the ripple extends to the outer surface of the conduit. If the ripples extend inside the conduit, the end coupling would be connected by set screws or by any other equivalent means.

The end coupling 40 has a conventional threaded portion 42 which is adapted to extend into a conventional hole 43 of an electrical connection box 44, where it is secured by means of nut 45.

The invention has been described in connection with cables and in connection with this use it is noted that the conduit is ventilated which will tend to keep the cable cool under overload conditions and permit the use of smaller wires in the cables. The rings may be made of aluminum that will be non-magnetic and not carry magnetic currents resulting from any current flow in the cables. In the event of malfunction in the cable, it will be relatively easy to locate the trouble since the cable may be visually inspected through the spaces in the rings.

The ears or shoulders and flat portions of the ring members locate the strips into position and prevent the rings from moving relative to the strips which might cause the entire conduit to collapse. The flexibility of the device is proportional to the depth of the ripples to the strips. In other words, the deeper the ripples, the more the bending. In one embodiment the depth of the ripples was about $5/16$ of an inch and the thickness of the strip was $3/32$ of an inch. The strip was of cold rolled steel.

The flexibility is also inversely proportional to the thickness of the strip. If the strips are made thin enough for instance, $1/64$ of an inch, the device will be flexible in all planes even if four strips are used, whereas if the strips are made thicker for instance, $3/32$ of an inch and the four strips are used and the depth of the ripples are approximately twice the thickness, then the conduit will be rigid in all planes.

Therefore, the device is quite versatile and can be made for various conditions by choosing the thickness of the material and the depth of the ripples. In addition, choice of strip material can effect the flexibility, for instance stainless steel will be more flexible than cold rolled steel.

For straight run conduit, flat strips may be used. Flat strips without ripples provide rigid straight sections of the conduit.

In view of the versatility of the device, it may have structural uses.

Although, the invention has been described in connection with electrical cables, it will be apparent that the invention may be used to support hoses, tubing, or pipes or the like for instance, in factories, chemical plants, oil refineries and so forth.

Due to the ease of installing the conduit of the present invention on the job, practically all shop work is eliminated and engineering layouts may be limited to very simple line drawings. No expensive bending or elbows are required, as in the conventional conduit, due to the rigidity of the tubing in the vertical plane as shown in FIGURE 1.

A minimum number of support straps are required. Also, to the same property, the conduit may be strung for a considerable length without supports for instance, between buildings or over rivers, canals and so forth.

Another advantage of ventilation is that no pressure can be built up which may cause explosion in the conduit and the use of light weight rings such as aluminum will provide the maximum strength with the minimum weight.

Another advantage of the invention, is that inventory problems are reduced to a minimum since the rings and strips may be stored separately until needed with minimum space requirements. Furthermore, it is not necessary to stock predetermined lengths of conduit. The strips may be stored in reel form for instance 500 feet in length and may be cut as desired.

The rings are preferably made of aluminum for light weight, however, they are not limited to this material but may be made of other materials such as other metals or plastics. The strips may be made of any metal. Cold rolled steel is adequate and stainless steel may be used for greater strength and corrosion resistance. Also, the strips and the rings may even be made of plastics if fire resistance is not important.

The fact that conduit is substantially rigid in one plane permits a neat installation with a minimum of support members. Conventional conduit of the so called BX type is flexible in all planes and it is difficult to mount in a straight neat appearing manner.

The conduit may be reinforced as desired by using adapter rings and a plurality of strips. Three or more spaced strips will make the conduit substantially rigid in all planes.

Many modifications may be made by those who desire to practice the invention without departing from the scope thereof which is defined by the following claims:

I claim:
1. In an electrical distribution system a conduit comprising:
    a plurality of metal rings having oppositely located flats placed between two shoulders,
    means to connect said metal rings at said flats in spaced relation for flexing in one plane only comprising:
    a pair of metal strips, said strips having equally spaced transverse corrugations therein,
    said rings being fixedly connected to said strips between said corrugations, said strips being placed on opposite sides of said rings, whereby said flexing takes place about the edges of said strips substantially only in a plane parallel to said strip, said strips being substantially wider than their thickness.

2. First and second hollow tubular support means for cables, hoses and piping each comprising:
- a plurality of metal rings, having oppositely located flats placed between two shoulders,
- means to connect said metal rings at said flats in spaced relation comprising:
- a pair of metal strips, said strips having equally spaced transverse corrugations therein,
- said rings being fixedly connected to said strips between said corrugations, said strips being placed on opposite sides of said rings,
- whereby said flexing takes place about the edges of said strip substantially only in a plane parallel to said strip, said strips being substantially wider than their thickness, and adapter ring means to connect said first and second support means together with an angular rotation between them.

References Cited

UNITED STATES PATENTS

| | | | |
|---|---|---|---|
| 3,301,940 | 1/1967 | Rischard et al. | 138—120 X |
| 267,473 | 11/1882 | Westinghouse | 138—110 |
| 444,477 | 1/1891 | Wright | 174—68 X |
| 1,677,077 | 7/1928 | Fortune | 138—110 X |
| 2,410,753 | 11/1946 | Shinomiya | 138—110 X |
| 3,060,972 | 10/1962 | Sheldon | 138—120 |
| 3,071,161 | 1/1963 | Ulrich | 138—120 |
| 3,183,940 | 5/1965 | Alquist et al. | 138—106 |

LAVERNE D. GEIGER, *Primary Examiner.*

EDWARD J. EARLS, *Assistant Examiner.*

U.S. Cl. X.R.

174—68; 248—49